United States Patent
West et al.

(10) Patent No.: US 12,291,832 B2
(45) Date of Patent: May 6, 2025

(54) TRUSS FOUNDATION ADJUSTMENT TOOL

(71) Applicant: Ojjo, Inc., San Rafael, CA (US)

(72) Inventors: Jack West, San Rafael, CA (US);
Charles Almy, Berkeley, CA (US)

(73) Assignee: OJJO, INC., San Rafael, CA (US)

( * ) Notice: Subject to any disclaimer, the term of this patent is extended or adjusted under 35 U.S.C. 154(b) by 630 days.

(21) Appl. No.: 17/395,455

(22) Filed: Aug. 5, 2021

(65) Prior Publication Data

US 2022/0056657 A1    Feb. 24, 2022

Related U.S. Application Data

(60) Provisional application No. 63/061,717, filed on Aug. 5, 2020.

(51) Int. Cl.
| | |
|---|---|
| E02D 5/80 | (2006.01) |
| E04G 21/18 | (2006.01) |
| F24S 25/617 | (2018.01) |
| F24S 25/70 | (2018.01) |
| H02S 20/10 | (2014.01) |
| H02S 20/32 | (2014.01) |

(52) U.S. Cl.
CPC ......... *E02D 5/801* (2013.01); *E04G 21/1841* (2013.01); *F24S 25/617* (2018.05); *F24S 25/70* (2018.05); *H02S 20/10* (2014.12); *H02S 20/32* (2014.12); *Y02E 10/47* (2013.01); *Y10S 52/01* (2013.01); *Y10S 269/904* (2013.01)

(58) Field of Classification Search
CPC ..... E02D 5/801; E04G 21/1841; B66F 15/00; F24S 25/617; F24S 25/70; H02S 20/10; H02S 20/32; Y10S 52/01; Y10S 269/904

USPC .................................................. 254/123, 129
See application file for complete search history.

(56) References Cited

U.S. PATENT DOCUMENTS

| | | | | |
|---|---|---|---|---|
| 494,417 | A * | 3/1893 | Cutting | B66F 15/00 254/131 |
| 857,077 | A * | 6/1907 | Labreck | B66F 15/00 254/131 |
| 977,245 | A * | 11/1910 | Wiest | B25B 27/26 81/484 |
| 1,776,037 | A * | 9/1930 | Leavitt | B60C 25/142 254/248 |
| 1,964,602 | A * | 6/1934 | Schumacher | B60C 25/142 254/50.1 |
| 2,044,681 | A * | 6/1936 | Griffith | B60C 25/142 29/221 |

(Continued)

FOREIGN PATENT DOCUMENTS

CN    111674442  A  *  9/2020

*Primary Examiner* — Jessie T Fonseca
(74) *Attorney, Agent, or Firm* — Fredrikson & Byron, P.A.

(57) ABSTRACT

A tool for adjusting driven truss components and assembled truss foundations. A bridge separates a pair of collars, each having a pair of offset bearing surfaces that fit around the truss legs. A lever arm terminating in a handle extends away from the bridge to give leverage to the tool operator. The bridge width is adjustable to enable positioning of the tool at different heights along the driven truss components. An additional receiver proximate to one of the collars may enable single leg operation. Lateral and angular adjustment of the lever arm with respect to the bridge may enable greater force to be applied to one leg relative to the other.

14 Claims, 5 Drawing Sheets

(56) References Cited

U.S. PATENT DOCUMENTS

| | | | | | |
|---|---|---|---|---|---|
| 2,474,515 | A | * | 6/1949 | William | B60C 25/02 254/50.1 |
| 3,014,749 | A | * | 12/1961 | Carrow | A63D 5/08 56/339 |
| 4,250,769 | A | * | 2/1981 | Herring | E01F 9/60 254/129 |
| 6,012,705 | A | * | 1/2000 | Staten | B60C 25/142 254/DIG. 10 |
| 2015/0314886 | A1 | * | 11/2015 | Guida | B64F 1/224 254/129 |
| 2020/0102758 | A1 | * | 4/2020 | Mizelle | E04F 21/22 |
| 2021/0257964 | A1 | * | 8/2021 | Hudson | H02S 20/10 |

\* cited by examiner

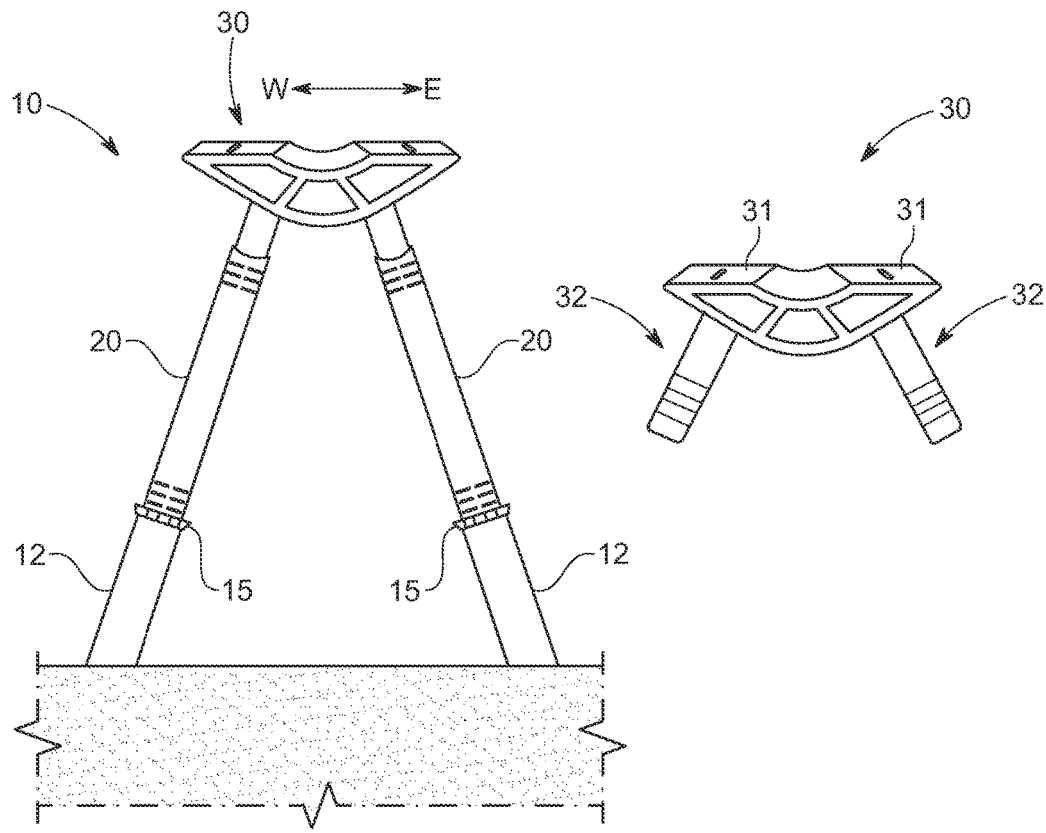
FIG. 1
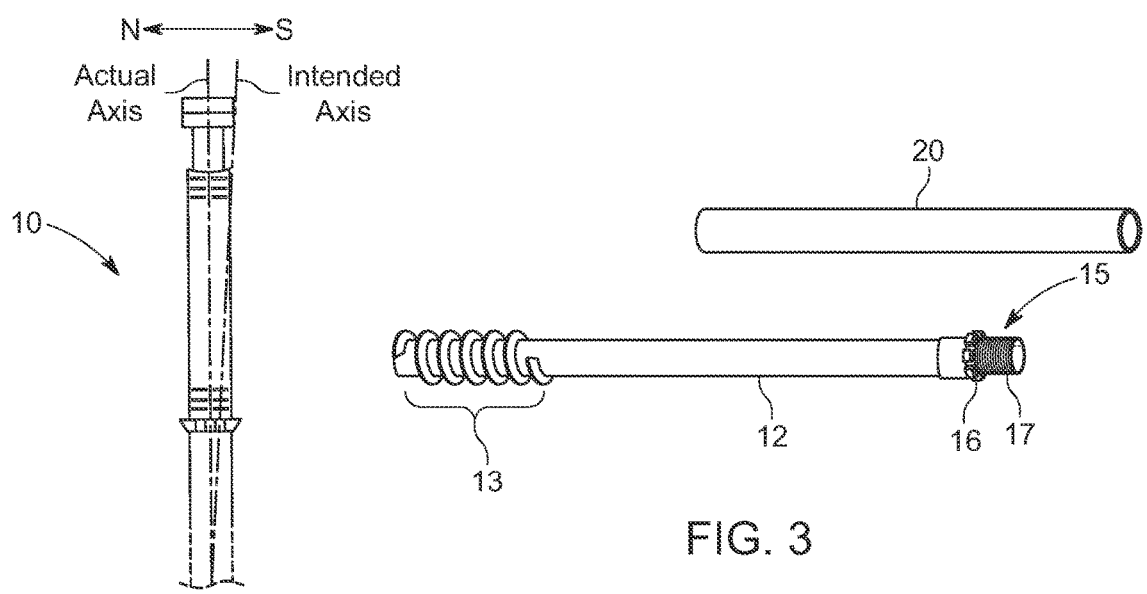
FIG. 2
FIG. 3

TRUSS FOUNDATION ADJUSTMENT TOOL

CROSS-REFERENCE TO RELATED APPLICATIONS

This claims priority to U.S. provisional patent application No. 63/061,717 filed on Aug. 5, 2020, titled "Truss adjustment tool", the disclosure of which is hereby incorporated by reference in its entirety.

BACKGROUND

The applicant of this disclosure has developed a novel foundation system for supporting single-axis tracker and other structures. The system, known commercially as EARTH TRUSS, consists of a pair of adjacent truss legs driven into the ground at angles to one another on either side of a row, and joined together above-ground with an adapter or truss cap to form a truss foundation with the ground. Unlike conventional monopile foundations that resist lateral tracker loads generated by wind striking panels on the torque tube by resisting moments, EARTH TRUSS translates such loads primarily into axial forces of tension and compression, allowing for less steel and shallower embedment depths to support single-axis trackers.

In order to maximize market acceptance of this foundation, it must be compatible with all leading tracker makers, including those from NEXTracker, Inc. of Fremont, CA and Array Technologies, Inc. of Albuquerque, NM, the current market leaders at least in the U.S. utility-scale market. Both manufacturers make their trackers to sit on convention monopile foundations but due to the differences in the design of their respective systems, they have different tolerances along different axes (X, Y and Z) relative to one another. For example, in the NEXTracker system, where the torque tube is offset from the drive axis and suspended from a bearing pin in a bearing housing assembly (BHA), position along the tracker row, that is, in the X-direction, is important because the NEXTracker BHA extends above the plane of the solar panels. Misalignment of the foundation along the X-axis may result in mechanical interference between the BHA and/or foundation and panels attached to the torque tube.

By contrast, ATI's tracker utilizes a more traditional design, at least with respect to the axis of rotation, in that the torque tube rotates about its own axis insider a bearing assembly. Because the torque tube can spin about its own axis within the bearing, this system may be relatively more tolerant in X but able to tolerate only small misalignment Y, that is East to West, because such tolerances may put strain on the torque tube. Therefore, with either of the tracker systems, and with systems manufactured by other tracker makers, consistent foundation alignment is important to prevent undue degradation of tracker components.

In recognition of the need for precise alignment, various embodiments of the invention may provide a tool for adjusting individual truss legs or for simultaneously adjusting a pair of driven truss components or even an entire assembled truss foundation to bring it into positional tolerance for the tracker system it will support.

BRIEF DESCRIPTION OF THE DRAWINGS

FIG. 1 is a front view of an assembled EARTHTRUSS foundation including truss cap and truss legs in accordance with various embodiments of the invention;

FIG. 2 is a side view of the assembled EARTHTRUSS foundation of FIG. 1 showing misalignment of truss legs between an intended axis and an actual axis;

FIG. 3 shows exemplary EARTHTRUSS leg components in accordance with various embodiments of the invention;

DETAILED DESCRIPTION

Figure 4A:
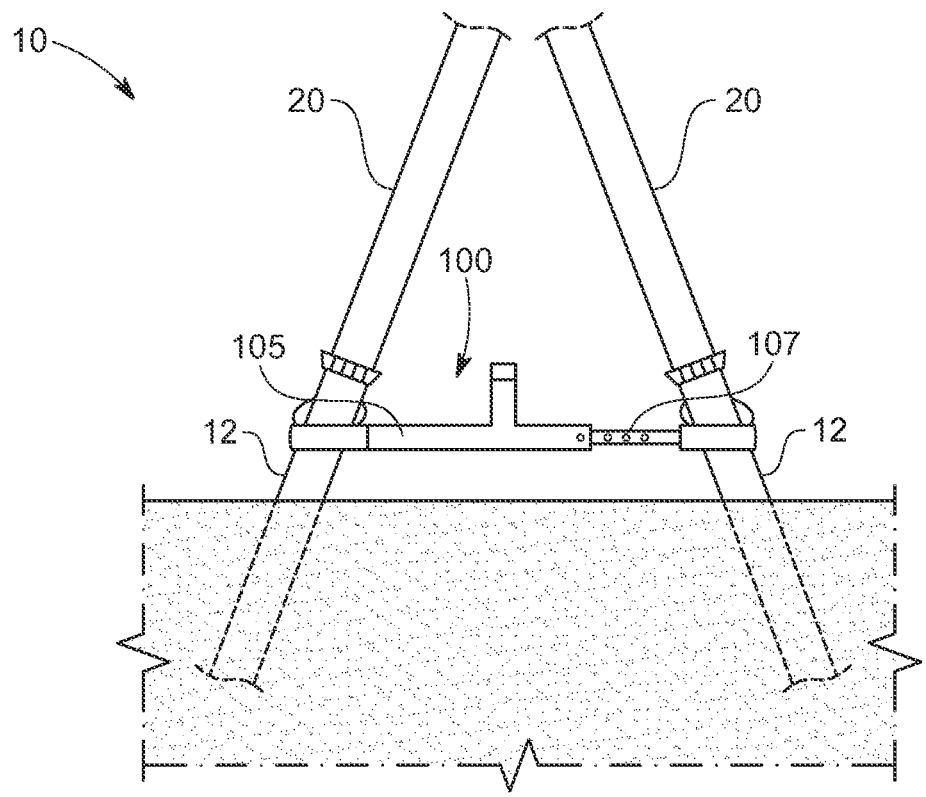
FIG. 4A shows a truss foundation adjustment tool engaged with an assembled EARTHTRUSS foundation in accordance with various embodiments of the invention.

The following description is intended to convey a thorough understanding of the embodiments described by providing a number of specific embodiments and details involving truss foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Turning now to the Figures, FIG. 1 shows truss foundation system 10 for supporting a single-axis tracker, such as the aforementioned EARTH TRUSS foundation system developed by the applicant of this disclosure. FIG. 3 shows the components used to construct the EARTH TRUSS foundation of FIG. 1. As shown, foundation system 10 consists of a pair of screw anchors 12 driven into the ground and angled toward one another about opposing sides of an intended North-South tracker row. Each screw anchor 12 is an elongated, open, tubular member with an external thread form 13 at the leading or lower end and a driving coupler 15 at the opposing upper end. As shown, driving coupler 15 has a ring of teeth-like features 16 that are engaged by the chuck of a rotary driver used to drive them into the ground with a combination of torque and downforce, and also has a connecting portion 17 extending above ring 16 that are received in the open end of upper leg section 20. Connection portion 17 generally consists of a rounded cross-section projection with a series of recesses circumscribing its outer surface. In various embodiments, the outline of this projection may be an oblate spheroid to enable some degree (<5-degrees) of axial adjustment between driven screw anchor 12 and upper leg section 20 prior to crimping upper leg section 20 around connecting portion 17 of coupler 15. That is, once sleeved over connection portion 17, upper leg 20 may pivot about the spheroid shaped projection while resting against ring 16.

Upper leg sections 20 is also lengths of hollow steel tube that are sleeved over respective ones of the connecting portions 17 of each driving coupler 15. A so-called truss cap or adapter 30 completes the truss foundation. In this example, truss cap 30 has a pair of upper mounting surfaces 31 that support tracker components and a pair of tubular connection portions 32 that extend downward towards the driven screw anchors. Upper leg section 20 join truss cap 30 to screw anchors 12. It should be appreciated that truss cap 30 is specifically designed to support a NEXTracker single-axis tracker. Truss caps designed to support an ATI tracker or other third-party tracker may have different upper mounting surfaces consistent with the needs and geometries of those tracker systems but will still rely on a pair of connection portions such as portions 32 that extend below the mounting surface into respective ones of the upper legs.

Typically, after the pair of adjacent screw anchors 12 are driven to the desired embedment depth using the truss driver and truss assembly machine, truss cap 30 is held in place with a jig or other device on the installation machine at the precise position and orientation that will enable alignment with other truss caps in the same row. Then, upper legs 20 are sleeved over connection portions 32 on the truss cap and slipped down onto connecting portions 17 of each screw anchor, resting against ring 16. A hydraulic crimping device also attached to the machine may be used to deform upper leg sections 20 into the recessed channels formed on connecting portions 32 and 17 of the truss cap and coupler respectively, thereby locking the truss together at the appropriate orientation.

Once constructed, the legs and truss cap form an A-frame-shaped truss with the ground that defines an A-frame that is oriented substantially orthogonally to the axis of the torque tube. As mentioned in the background, certain tracker systems may be sensitive to misalignment in X, that is the location of the truss A-frame along the torque tube relative to an intended location specified by a distance to the next adjacent truss foundation. In systems where space is deliberately introduced between modules straddling the bearing, such as in the NEXTracker single-axis tracker, tolerance for misalignment in X may be very small (e.g., 1-2 cm). If the screw anchors forming the truss are driven at the wrong location in X or, are driven with unintentional positive or negative lean in the X-direction (i.e., North or South), when the bearing assembly or bearing housing assembly of the tracker is mounted on the truss cap, it may be misaligned with respect to others in the same row to a greater extent than can be taken up with the X-axis adjustability of the tracker system.

This misalignment case is shown graphically, for example, in FIG. 2. Here, the assembled truss foundation 10 is leaning slightly to the North relative to its intended axis. As a result, the A-frame may not be orthogonal to the torque tube when the installer attempts to install it. It should be appreciated that in some cases achieving orthogonality to the torque tube may be a requirement. In such cases, the truss formed with by the foundation with the ground may not be plumb when looking at a side view, such as in FIG. 2. In other cases, where orthogonality is not a requirement, the intended axis may or may not be plumb. In the example of FIG. 2 it is sufficient to note that when viewed from the West direction (i.e., looking into the page), the assembled truss is slightly off of its intended axis of orientation leaning toward the North, and requires adjustment.

Misalignment is not a problem unique to truss foundations. In fact, pile mitigation is standard practice for conventional H-pile foundations for single-axis trackers because they are driven with far less precision truss foundation components. Typically, another contractor comes to the array site after all H-piles are driven to bump or pull on them with a piece of motorized equipment to nudge or force them into alignment so that they match other H-piles in the same row. In the case of H-piles, adjustment typically means making them plumb. Borrowing this technique, the situation depicted in FIG. 2 may be addressed by bumping or pulling on the truss assembled truss with a vehicle or piece of heavy equipment to bring it into alignment. While this may redirect the A-frame, it also runs the risk of dislodging the screw anchor threads from the soil they are in contact with, reducing the bearing capacity and resistance to pull out of the truss legs, effectively compromising that foundation. This may require further testing to confirm that the truss legs are still capable of handling the foundation loads specified by the tracker maker or, in the worst case, may require replacement of the truss. Therefore, to prevent this undesirable outcome, various embodiments of the invention, as shown in FIGS. 4A-D, provide a tool for adjusting a truss foundation, or alternatively a screw anchor used in a truss foundation, after the anchor has been driven or even after the truss has assembled.

Figure 4B:
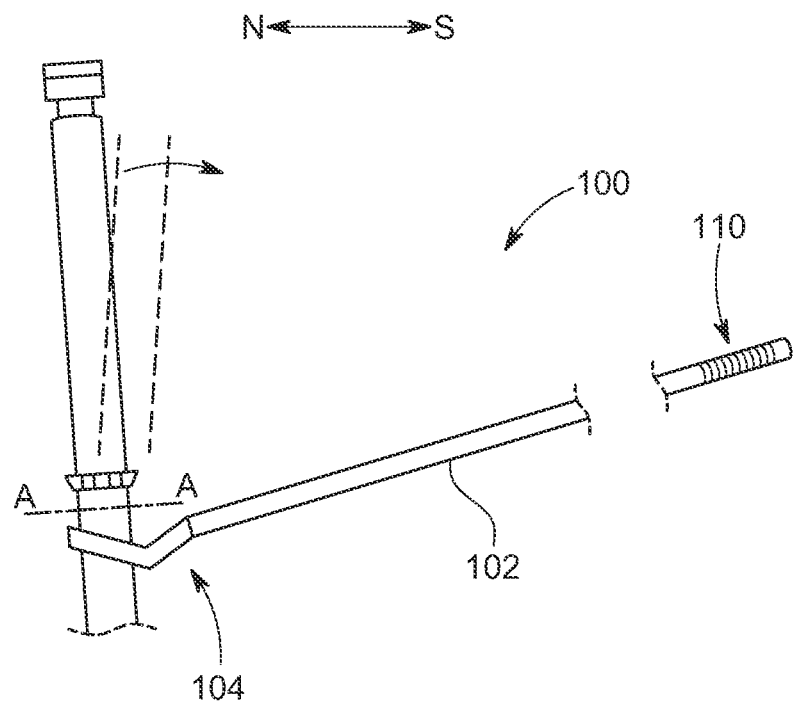
FIG. 4B is a side view of the truss foundation adjustment tool engaged with an assembled misaligned EARTHTRUSS foundation in accordance with various embodiments of the invention.

Beginning with FIGS. 4A and 4B, truss foundation adjustment tool 100 consists of a pair of opposing collar portions 104 spaced apart by bridge 105. Each collar portion 104 has at least two opposing offset bearing points 108A/108B that have curved surfaces and that are offset from one another so when the collar is placed around foundation component, such as a screw anchor, these bearing points 108A/B will hit anchor's shaft at different positions along its length forcing a kink in it. This will reduce and ideally prevent the bending force from dislodging the below ground components. As seen in FIGS. 4A and 4D, bridge 105 may be partially telescoping to enable the distance between the two collars to be adjusted to fit trusses having a different above-ground leg spacing. This may be done, as shown, with a series of holes and a pin to enable one section 107 to be telescoped into the main section 105 at multiple different positions. In various embodiments, and as shown in these figures, each collar 104 may be open in the same direction to enable it to be slide onto the truss legs from the left or the right, as seen, for example, in the top view of FIG. 4D. In various embodiments, a lever arm such as arm 102 terminating in grip or handle 110, is connected orthogonally to the bridge and extends out a long distance (e.g., 6~10-feet) to provide sufficient mechanical advantage to the installer to enable him or her to simultaneously bend the truss legs in the X-direction (North or South) until the truss' actual orientation matches its intended one. The pair of opposing bearing points 108A/B in each collar 104 enable bending of the truss legs between these two points rather than leveraging against the portion of the screw anchor (truss leg) embedded below ground.

Figure 4C:
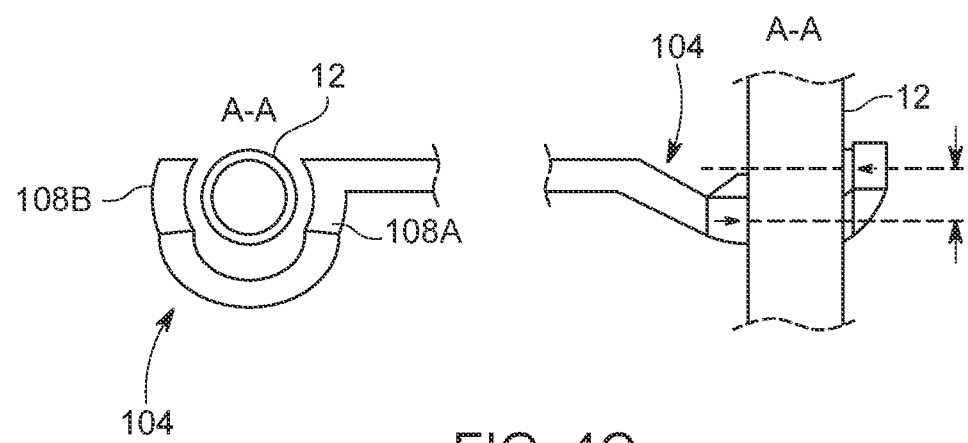
FIG. 4C shows top and side views respectively of a collar or a truss adjustment tool engaged with a truss leg component in accordance with various embodiments of the invention.
Figure 4D:
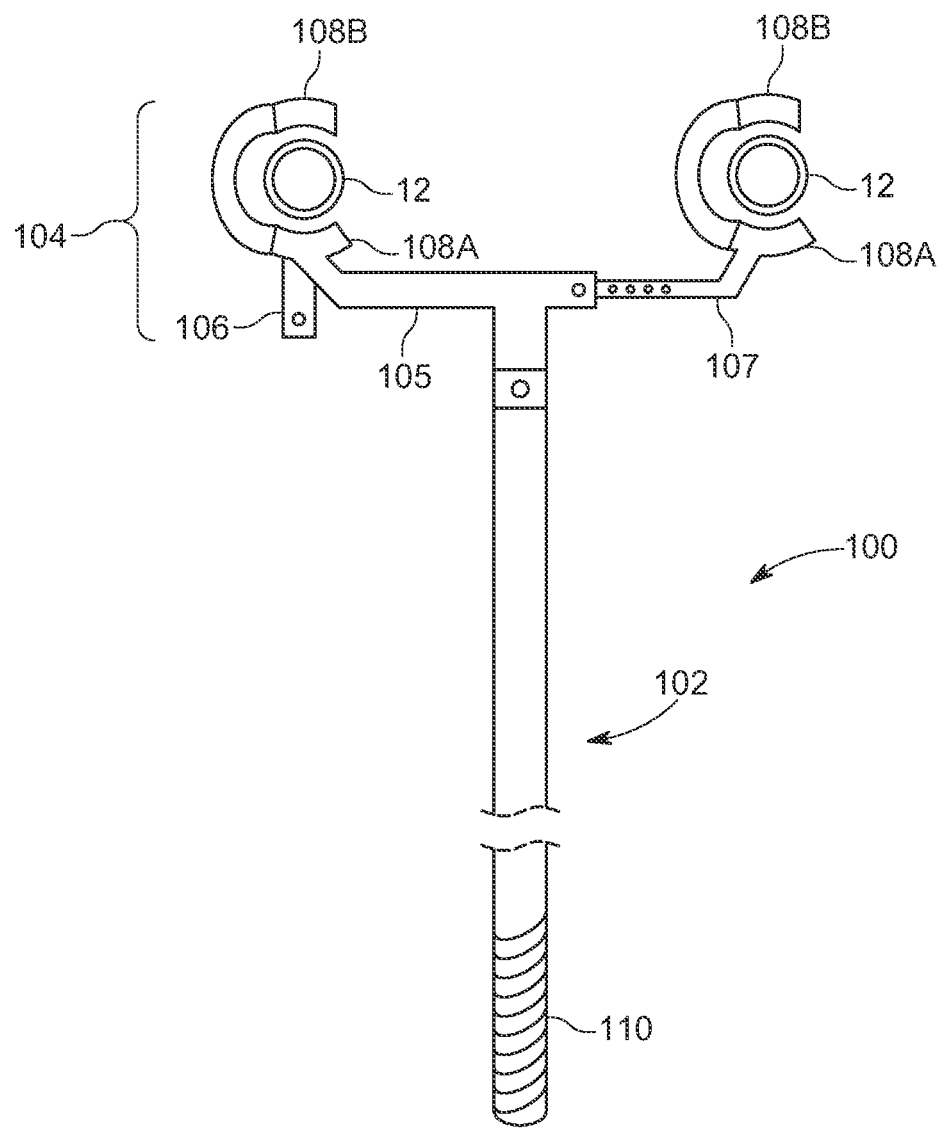
FIG. 4D shows a top view of the truss adjustment tool engaged with a pair of adjacent truss legs in accordance with various embodiments of the invention.

FIGS. 4B and 4C show the impact of truss adjustment tool 100 on the truss legs. A slight downward bend between bridge 105 and collar 104 sets the lower bearing point that engages the lower part of the truss leg. Collar 104 then extends upward, away from that bearing point to set a second bearing point. Therefore, when force is applied to lever arm 102, the truss leg is bent in the region between these two bearing points as shown in FIG. 4C. The bending forces are concentrated predominately in this area rather than leveraging against the embedment of the screw anchor.

It should be appreciated that in some cases, a foundation component such as a screw anchor may need to be adjusted individually, either because only a single component has been used (non-truss applications) or because only one leg of a pair of adjacent legs is misaligned. To that end, FIG. 4D shows that in some embodiments, one of the collars 104 may have its own receiver 106 for receiving lever arm 102 for use in a single-leg mode. That is, bridge extension 107 may be removed from main portion 105 and lever arm 102 may be connected to connecting portion 106 (i.e., inserted into or sleeved over) rather than at the main connection point closer to the middle of the bridge so that a bending force may be applied to one leg insolation of the other. This may be particularly useful where only one of the two adjacent truss legs is out of alignment.

Figure 5A:
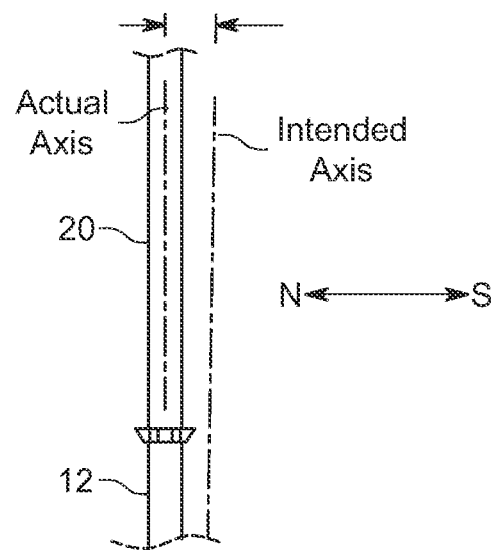
FIG. 5A is a side view of a misaligned truss foundation in accordance with various embodiments of the invention.
Figure 5B:
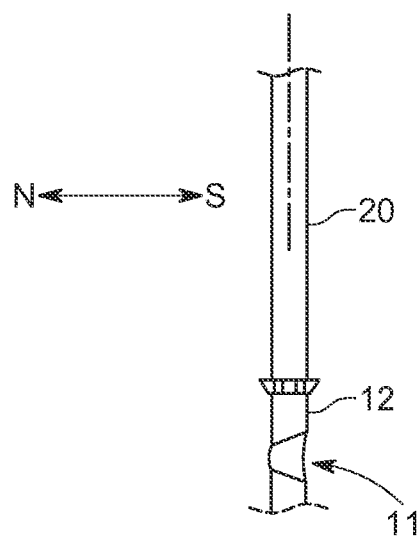
FIG. 5B is the side view of the truss foundation of 5A after using the truss foundation adjustment tool to redirect the axis of the truss legs.

FIGS. 5A and 5B show another use case where the assembled truss's actual axis is parallel to its intended axis, but it is offset in the X direction (i.e., North-South direction). In other words, in this example, the truss is not leaning North or South, but rather has simply been installed in the wrong location along the X-axis or intended tracker row. This could result in interference between the foundation or tracker components and modules attached to the torque tube. When confronted with this misalignment case, simply bending the truss in X will not bring the truss into alignment because it will change the pitch of the truss cap introducing another form of misalignment. Therefore, in this case, it may be necessary to attach adjustment tool 100 to the legs of the truss, perform a first bending operation to bend the truss toward the South, then, remove the tool and attach it to the legs on the opposing side of the truss, slightly above the first bend location, and bend it back in to lean towards the opposing the Northern direction. This will put a double kink 11 in each leg and enable the truss leg axes to be aligned with their intended axis. To the extent this double kink reduces the available leg length to elevate the truss cap to the required height in Z, this may be compensated for by having connecting portions 32 of truss cap 30 extend less distance in their respective upper legs 20 before crimping these components together. Additional length is added to truss cap connection portions 32 to compensate for such adjustments.

Figures 6A, 6B:
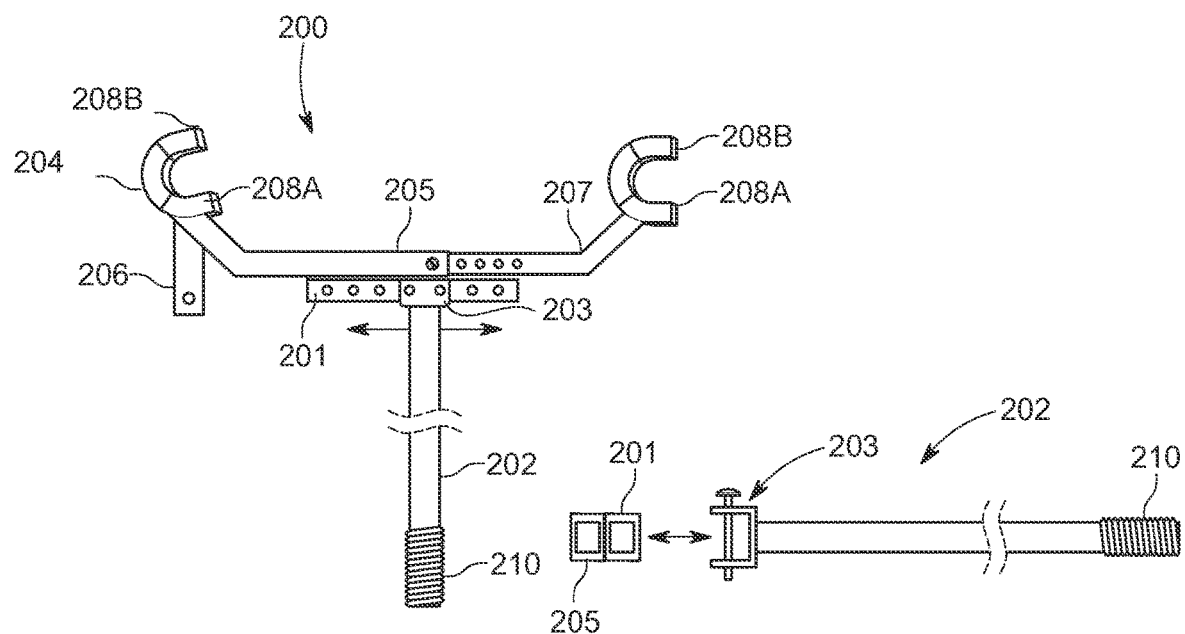
FIGS. 6A and 6B are top and side views of a truss foundation adjustment tool according to various other embodiments of the invention.

Turning now to FIGS. 6A/B and 7A/B, these figures show truss foundation adjustment tools 200 and 300 respectively according to various other embodiments of the invention. Beginning with FIGS. 6A and 6B, in some instances, misalignment may exist on both truss foundation legs but be greater on one leg than on the other. In such cases, it may be desirable for the adjustment tool to disproportional adjust one leg relative to the other. To accomplish this, in some embodiments, the tool may be modified as shown for example by tool 200 in FIGS. 6A and 6B. Like tool 100, tool 200 has pair of opposing collars 204 separated by adjustable bridge 205 and lever arm 202. However, in addition, the bridge also has a lateral adjustment bar 201 that enables lever arm 202 to be positioned at different spots along the bridge via bracket 203. Adjustment bar 201 may be a section of standard square steel tube stock with a series of evenly spaced holes and bracket 203 may slide along bar 201 to different positions enabling the force on the left or right leg to be increased or decreased relative to the force on the other when pressure is applied to the lever arm.

Figures 7A, 7B:
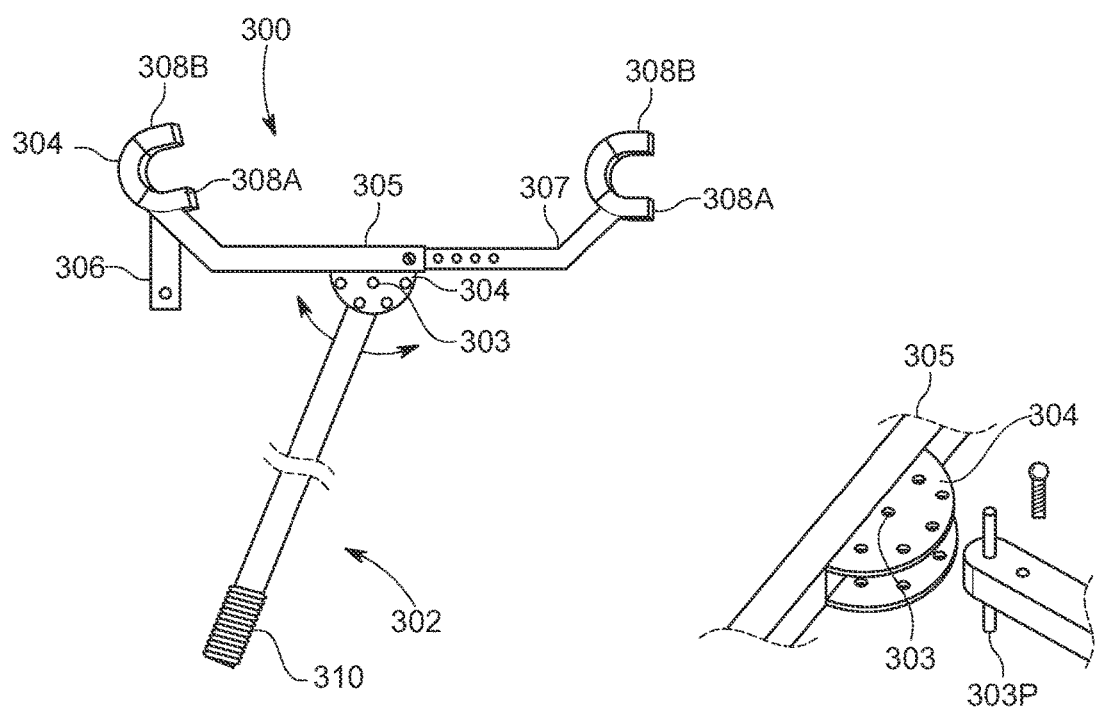
FIGS. 7A and 7B are top and perspective views respectively of a truss foundation adjustment tool according to further embodiments of the invention.

Moving on to FIGS. 7A and 7B, in other cases, misalignment of the truss legs from their intended axis may be in both X and Y directions (i.e., North-South and East-West). In such cases, it may be necessary to apply a force on the truss legs that is not oriented along only on the X or North-South axis. In such cases, a truss adjustment tool such as tool 300 may be used. Tool 300 is similar to tool 200 except that adjustment bar 204 has been replaced with pivot plate 304 that secures lever arm 302 with hinge 303 and hinge pin 303P. A second pin may be inserted through overlapping holes in plate 304 and in lever arm 302 to set the correct angular orientation with respect to the bridge to bias the arm in the direction of one or the other of couplers 304 to bend the truss legs in both X and Y at the same time.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A tool for adjusting a truss foundation comprising:
 a first collar portion for receiving a first truss component;
 a second collar portion for receiving a second truss component;
 a bridge portion interconnecting the first and second collar portions; and
 a lever arm connected to the bridge portion and extending away from, the lever arm terminating in a handle, wherein the first and second truss components are selected from the group consisting of a pair truss legs and a pair of driven screw anchors.

2. The tool according to claim 1, wherein the length of the bridge is adjustable to change a distance between the first and second collar portions.

3. The tool according to claim 1, wherein the first and second collar portions comprise respective pairs of offset bearing points.

4. The tool according to claim 3, wherein each pair of offset bearing points are oriented to receive respective truss components.

5. The tool according to claim 4, wherein each pair of offset bearing points are oriented to receive respective truss components that are non-parallel to one another.

6. The tool according to claim 1, further comprising a connecting portion proximate to the first collar portion for connecting to the bridge portion to the lever arm to enable the tool to be used on a single truss component.

7. The tool according to claim 1, wherein a position of the lever arm along the bridge is adjustable.

8. The tool according to claim 1, wherein an angle of the lever arm with respect to the bridge portion is adjustable.

9. A tool comprising:
 a pair of collar portions separated by a bridge; and
 a lever arm extending away from the bridge and terminating in a grip, the lever arm for imparting a force to a pair of embedded foundation members via the collar portions, wherein the pair of embedded foundation members are selected from the group consisting of a pair of truss legs and a pair of embedded screw anchors.

10. The tool according to claim 9, wherein each collar portion comprises a pair of offset bearing portions adapted to bear against one of the pair of embedded foundation members.

11. The tool according to claim 9, wherein the bridge is adjustable to change a distance between the pair of collar portions.

12. The tool according to claim 9, wherein, a position of the lever arm with respect to the bridge is adjustable.

13. The tool according to claim 9, wherein an angle of the lever arm with respect to the bridge is adjustable.

14. The tool according to claim 9, further comprising a connecting portion proximate to one of the collars for connecting the bridge to the lever arm to enable the tool to be used on a single truss component.

* * * * *